A. T. Woodward,
Oil Vessel.

No. 111,599.  Patented Feb. 7, 1871.

Witnesses:
John H. Waterhouse
L. Loveland

Inventor:
Arthur T. Woodward

United States Patent Office.

ARTHUR T. WOODWARD, OF NEW YORK, N. Y.

Letters Patent No. 111,599, dated February 7, 1871.

IMPROVEMENT IN VESSELS FOR HOLDING OIL.

The Schedule referred to in these Letters Patent and making part of the same.

*To all whom it may concern:*

Be it known that I, ARTHUR T. WOODWARD, of the city, county, and State of New York, have invented and made a certain new and useful Improvement in Lamps, and Oil or Fluid-holding Vessels; and I do hereby declare the following to be a full, clear, and exact description of the said invention.

A want has long been experienced of a reliable lamp and oil-holding vessel for use on board ships and elsewhere, which will be sufficiently strong and will keep the oil or other fluid at an even temperature and prevent it from corroding, which are the objectionable features of the lamps and oil-vessels now in use.

The object of my invention is to construct a lamp or oil-vessel specially so that the oil or other fluid-holding receptacle shall not be liable to be broken, and shall keep the oil or fluid at an even temperature and prevent its corrosion.

My invention consists in lining a metallic oil or fluid-holding vessel with wood or other heat and cold non-conducting material, so as to prevent the oil or other fluid from coming in contact with the metallic surface of the vessel to prevent its corrosion and to keep the oil or fluid at a more even temperature and in better condition for burning than when subjected to the sudden changes of heat and cold in metallic or glass vessels.

I form the lining of the desired thickness of wood or other suitable material, and saturate the same with glue or other suitable compound or cement to prevent the oil or fluid from penetrating.

I do not confine myself to any particular mode of manufacture, as it is obvious that the said lining or inside coating may be made in many ways.

The linings or inside oil-receptacles for lamps may be turned out of a solid piece, or may be put together in sections, or they may be made of a mixture of saw-dust and a suitable cement or other suitable yielding material, and compressed to shape.

The larger oil or fluid-holding vessels may be made in like manner, of a shape and size to suit the metallic case in which they are inclosed, or sheets of veneer may be rolled or laid together and caused to adhere by glue or other suitable material, and formed or cut to suit the metallic case.

In the accompanying drawing—

Figure 1:
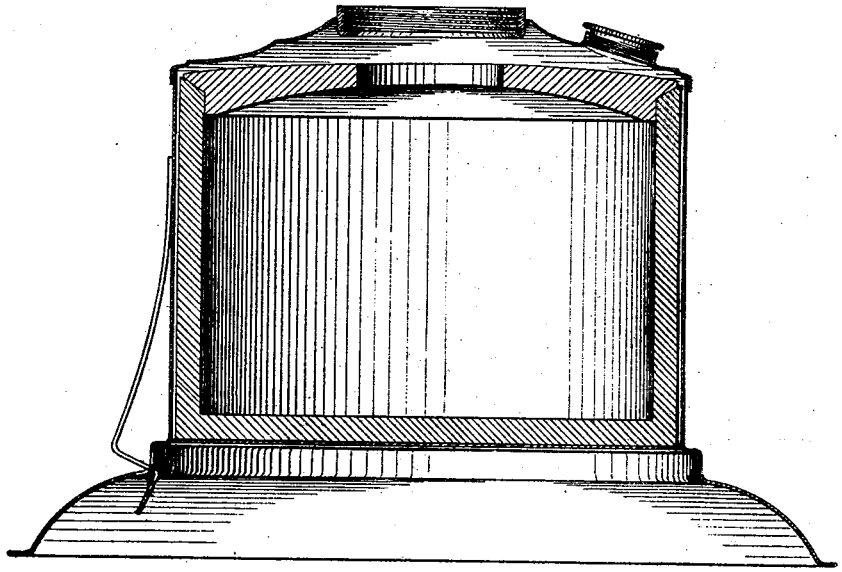

Figure 1 is a section of a lamp, showing the inside lining or oil-receptacle.

*a* denotes the metallic case, and

*b*, the lining or oil-holding vessel.

Figure 2:
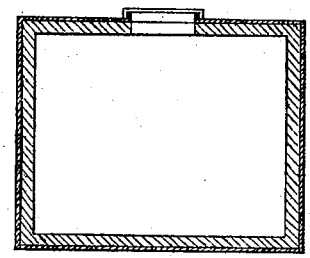

Figure 2 shows a section of an oil-holding vessel or tank, coated or lined, as above described.

Having thus fully described my invention,

What I claim, and desire to secure by Letters Patent, is—

The combination, with a metallic vessel, of a wooden or equivalent oil or fluid-holding vessel, arranged therein substantially as and for the purposes set forth and described.

Witnesses:    ARTHUR T. WOODWARD.
    JOHN H. WATERHOUSE,
    L. LOVELAND.